United States Patent
Liang (10) Patent No.: US 9,794,849 B2
(45) Date of Patent: Oct. 17, 2017

(54) METHOD AND SYSTEM FOR REPORTING TERMINAL MEASUREMENT AND INTER-OPERATING BETWEEN SYSTEMS

(75) Inventor: Jing Liang, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 582 days.

(21) Appl. No.: 13/994,694

(22) PCT Filed: Dec. 15, 2011

(86) PCT No.: PCT/CN2011/084039
§ 371 (c)(1),
(2), (4) Date: Aug. 27, 2013

(87) PCT Pub. No.: WO2012/079520
PCT Pub. Date: Jun. 21, 2012

(65) Prior Publication Data
US 2013/0336153 A1    Dec. 19, 2013

(30) Foreign Application Priority Data
Dec. 17, 2010    (CN) .......................... 2010 1 0593509

(51) Int. Cl.
*H04L 12/26* (2006.01)
*H04W 36/30* (2009.01)
(Continued)

(52) U.S. Cl.
CPC .......... *H04W 36/30* (2013.01); *H04W 24/10* (2013.01); *H04L 5/001* (2013.01); *H04W 36/14* (2013.01)

(58) Field of Classification Search
CPC ................................................... H04W 24/10
(Continued)

(56) References Cited

U.S. PATENT DOCUMENTS 6,628,630 B1 * 9/2003 Nagase ............. H04W 36/0083
370/331
6,845,238 B1 * 1/2005 Muller .................. H04W 36/18
370/331
(Continued)

FOREIGN PATENT DOCUMENTS

CN        101547486 A        9/2009
CN        102026264 A        4/2011
(Continued)

OTHER PUBLICATIONS

PCT International Search Report for PCT Counterpart Application No. PCT/CN2011/ 084039, 4 pgs., (Mar. 22, 2012).

*Primary Examiner* — Guang Li
(74) *Attorney, Agent, or Firm* — Blakely, Sokoloff, Taylor & Zafman LLP (57) ABSTRACT

Disclosed are a method and a device for reporting terminal measurement and for inter-system operation. The method comprises: receiving measurement configuration information transmitted by a source system access device; measuring cells on at least two frequencies within a target system on the basis of the measurement configuration information; on the basis of the measurement configuration information, and when a measurement report is triggered, reporting to the source system access device a measurement result acquired from measuring the cells on at least two frequencies within the target system, and on the basis of the measurement result, the source system access device confirming a main cell and an auxiliary cell for switching for the target system. The present invention assists a network in multicarrier handover between systems, and allows for reduced reporting latency, increased data transmission speed for a terminal switching PS domains between different systems, and enhanced user experience.

17 Claims, 6 Drawing Sheets

(51) Int. Cl.
*H04W 24/10* (2009.01)
*H04W 36/14* (2009.01)
*H04L 5/00* (2006.01)

(58) Field of Classification Search
USPC ......................................................... 370/252
See application file for complete search history.

(56) References Cited

U.S. PATENT DOCUMENTS

| | | | | |
|---|---|---|---|---|
| 7,194,260 | B1* | 3/2007 | Jabbary | H04W 24/00 370/251 |
| 8,054,802 | B2* | 11/2011 | Burgess | H04W 36/14 370/331 |
| 8,660,559 | B2* | 2/2014 | Tamura | H04W 24/10 455/436 |
| 9,014,141 | B2* | 4/2015 | Kim | H04L 5/001 370/331 |
| 9,088,912 | B2* | 7/2015 | Ou | H04W 24/10 |
| 9,191,847 | B2* | 11/2015 | Parkvall | H04W 24/10 |
| 2007/0213055 | A1* | 9/2007 | Sundberg | H04W 36/0083 455/436 |
| 2008/0039090 | A1* | 2/2008 | Jin | H04W 36/26 455/436 |
| 2008/0114887 | A1* | 5/2008 | Bryers | H04L 29/06 709/230 |
| 2008/0167041 | A1* | 7/2008 | Wang | H04W 36/30 455/436 |
| 2008/0233961 | A1* | 9/2008 | Cho | H04W 36/06 455/436 |
| 2009/0296580 | A1* | 12/2009 | Williams, Jr. | H04L 47/34 370/235 |
| 2009/0310563 | A1* | 12/2009 | Chou | H04L 27/0006 370/331 |
| 2010/0233962 | A1* | 9/2010 | Johansson | H04W 52/343 455/63.1 |
| 2010/0240358 | A1* | 9/2010 | Jen | H04W 36/385 455/424 |
| 2011/0028181 | A1* | 2/2011 | Byun | H04W 36/0083 455/525 |
| 2011/0039546 | A1* | 2/2011 | Narasimha | H04W 36/0055 455/423 |
| 2011/0103249 | A1* | 5/2011 | Kim | H04W 24/10 370/252 |
| 2011/0158118 | A1* | 6/2011 | Chou | H04L 27/2601 370/252 |
| 2011/0269469 | A1* | 11/2011 | Xiao | H04W 36/0072 455/436 |
| 2011/0281578 | A1* | 11/2011 | Narasimha | H04L 5/001 455/423 |
| 2011/0286433 | A1* | 11/2011 | Xiao | H04L 5/0007 370/331 |
| 2012/0039302 | A1* | 2/2012 | Chun | H04W 36/0027 370/331 |
| 2012/0177047 | A1* | 7/2012 | Roitshtein | H04L 69/22 370/392 |
| 2012/0214540 | A1* | 8/2012 | Narasimha | H04W 36/30 455/525 |
| 2013/0058245 | A1* | 3/2013 | Van Lieshout | H04W 36/0083 370/252 |
| 2013/0070584 | A1* | 3/2013 | Hutchison | G06F 11/3058 370/216 |

FOREIGN PATENT DOCUMENTS

| | | | |
|---|---|---|---|
| KR | 10-2006-0059377 A | 6/2006 | |
| WO | WO 2010/078729 A1 | 7/2010 | |
| WO | WO2010126256 A1 * | 11/2010 | |

* cited by examiner

METHOD AND SYSTEM FOR REPORTING TERMINAL MEASUREMENT AND INTER-OPERATING BETWEEN SYSTEMS

CROSS-REFERENCE TO RELATED APPLICATIONS

This patent application is a U.S. National Stage under 35 U.S.C. §371 of International Application No. PCT/CN2011/084039, filed on Dec. 15, 2011, entitled METHOD AND SYSTEM FOR REPORTING TERMINAL MEASUREMENT AND INTER-OPERATING BETWEEN SYSTEMS, designating the United States, and claiming priority from Chinese Patent Application No. 201010593509.3, filed with the Chinese Patent Office on Dec. 17, 2010 and entitled "Method and system for reporting terminal measurement and inter-operating between systems", which is herein incorporated by reference in its entirety.

This application claims priority from Chinese Patent Application No. 201010593509.3, filed with the Chinese Patent Office on Dec. 17, 2010 and entitled "Method and system for reporting terminal measurement and inter-operating between systems", which is herein incorporated by reference in its entirety.

FIELD OF THE INVENTION

The present invention relates to the field of wireless communication technologies and particularly to a method and device for reporting terminal measurement and inter-system interoperation.

BACKGROUND OF THE INVENTION

In order to support a higher data transmission rate and to provide users with high-quality service, multi-carrier technologies are supported at present in both a Universal Mobile Telecommunication System (UMTS) and a Long Term Evolution-Advance (LTE-A) system, that is, resources of a plurality of carriers are aggregated to obtain a lager bandwidth and to serve a terminal together.

1) Multi-Carrier/Multi-Cell Technologies in UMTS

In order to improve a user peak rate and cell data throughput, in the UMTS system, multi-cell technologies are introduced for a Frequency Division Duplexing (FDD) mode, while multi-carrier technologies is introduced for a Time Division Duplexing (TDD) mode. The multi-carrier/multi-cell technologies are supported at present for both a High Speed Downlink Packet Access (HSDPA) and a High Speed Uplink Packet Access (HSUPA).

For the FDD mode, there is only one carrier in a cell, and the multi-cell technologies refer to aggregation of a plurality of consecutive or inconsecutive carriers under a same NodeB together to serve a UE concurrently to thereby provide a desired rate. The multi-cell technologies involve dual cells in the downlink, four cells in the downlink, dual cells in the uplink, etc., each cell of which is a backward-compatible cell that can independently operate, and when they serve a terminal concurrently, there is one and only one primary cell, and the others are all secondary cells.

For the TDD mode, there are multiple carriers in a TDD cell, and the multi-carrier technologies refer to aggregation of multiple carriers of the same TDD cell for communication by a UE. Multiple carriers in the TDD mode include three carriers in the downlink, six carriers in the downlink, and three carriers in the uplink, etc., and all of these carriers that can operate concurrently belong to the same TDD cell; and for the UE, only a primary cell is a backward-compatible cell that can independently operate, and the other secondary cells can be regarded as resources for use only under the multi-carrier technologies.

2) Carrier Aggregation Technology in LTE-A

Figure 1:
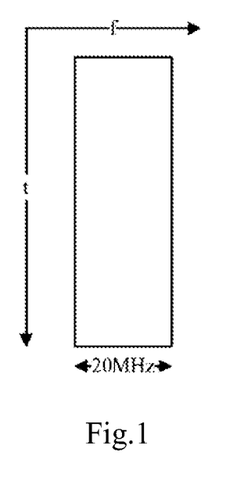
FIG. 1 is a schematic diagram of a carrier distribution in a cell of an LTE system.

In an LTE system, there is only one carrier with the maximum bandwidth of 20 MHz in a cell, as illustrated in FIG. 1.

In the LTE-A system, peak rates of the system have been greatly improved over the LTE system, and are required to reach 1 Gbps in the downlink and 500 Mbps in the uplink. The required peak rates can not be reached if only one carrier with the maximum bandwidth of 20 MHz is used. Thus, the LTE-A system has to extend the bandwidth available to the terminal, and to this end, a Carrier Aggregation (CA) technology has been introduced, that is, a plurality of consecutive or inconsecutive carriers under a same evolved NodeB, eNB, are aggregated together to serve the UE concurrently to thereby provide a desired rate. These carriers aggregated together are also referred to Component Carriers (CCs). Each cell can be a component carrier, and cells (component carriers) under different eNBs can not be aggregated.

Figure 2:
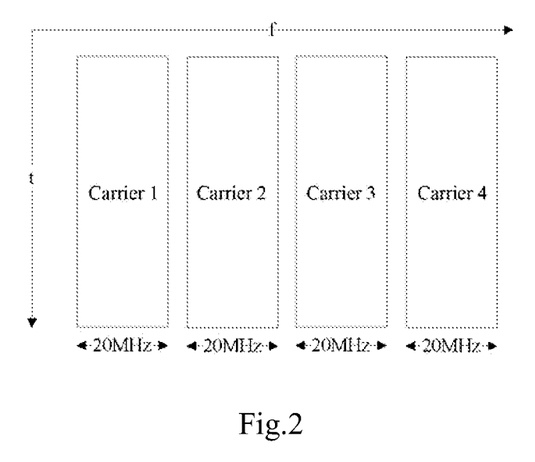
FIG. 2 is a schematic diagram of a carrier distribution when using carrier aggregation in an LTE-A system.

In order to ensure that the UE in the LTE system can operate over each aggregated carrier, the bandwidth of each carrier shall not exceed 20 MHz at most. The CA technology of the LTE-A system is as illustrated in FIG. 2, and under the evolved NodeB in the LTE-A system illustrated in FIG. 2, there are four carriers that can be aggregated, and the evolved NodeB can transmit data with the UE concurrently over the four carriers to thereby improve system throughout.

An inter-system interoperation technology, that is, Inter-Radio Access Technology (Inter-RAT), refers to a technology of interoperation between different systems, e.g., a handover technology between the UMTS system and the LTE system (Packet Switched Handover (PS HO)) and a redirection technology, and the use of these technologies can enable cooperative operation between different heterogeneous networks to better serve a multimode terminal. For a multimode terminal supporting both the UMTS system and the LTE system, a single-carrier handover between them is supported in existing protocols in order to ensure service continuity thereof and will be detailed below.

Figure 3:
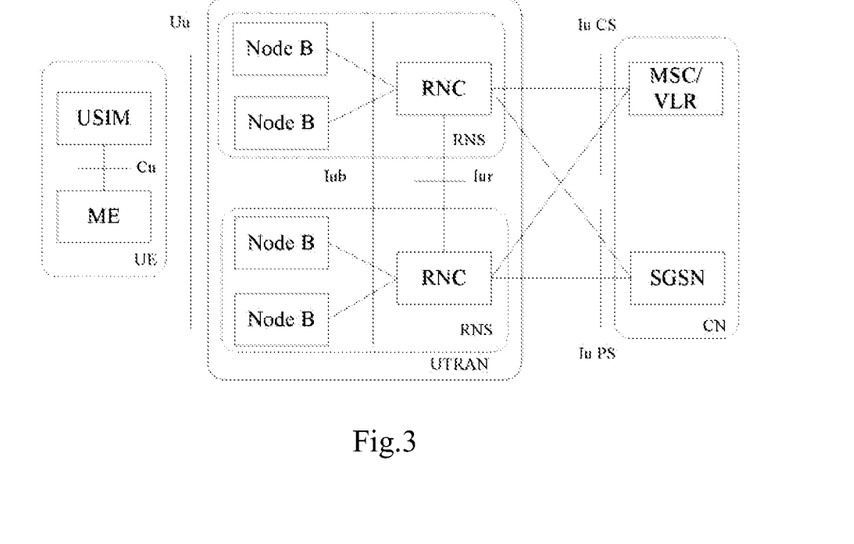
FIG. 3 is a network architectural diagram of a UMTS system.
Figure 4:
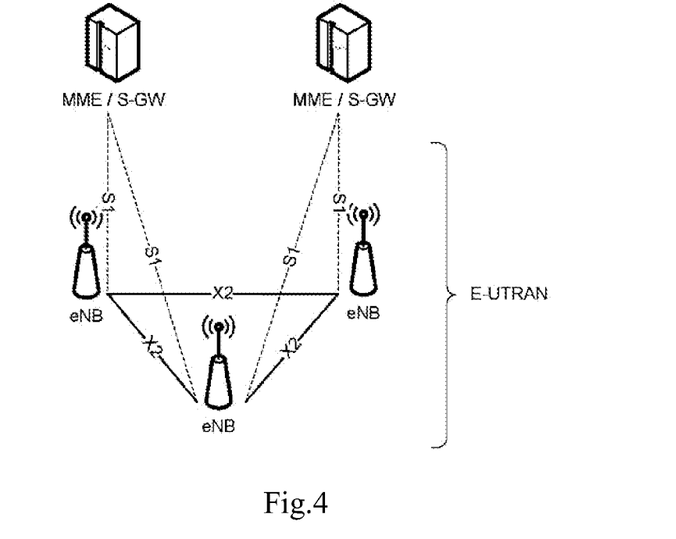
FIG. 4 is a network architectural diagram of the LTE system.

As illustrated in FIG. 3, it is an architecture of a UMTS network, which includes two parts: a Core Network (CN) and a UMTS Terrestrial Radio Access Network (UTRAN), wherein access network nodes in a PS domain includes a NodeB and a Radio Network Controller (RNC) which is connected with a Serving GPRS Support Node (SGSN) and a Mobile Switching Center (MSC)/Visitor Location Register (VLR). As illustrated in FIG. 4, it is an architecture of an LTE (also referred to as E-UTRAN) network, wherein access network nodes include an evolved NodeB, eNB, connected with a Mobility Management Entity (MME)/Serving Gateway (S-GW).

Figure 5:
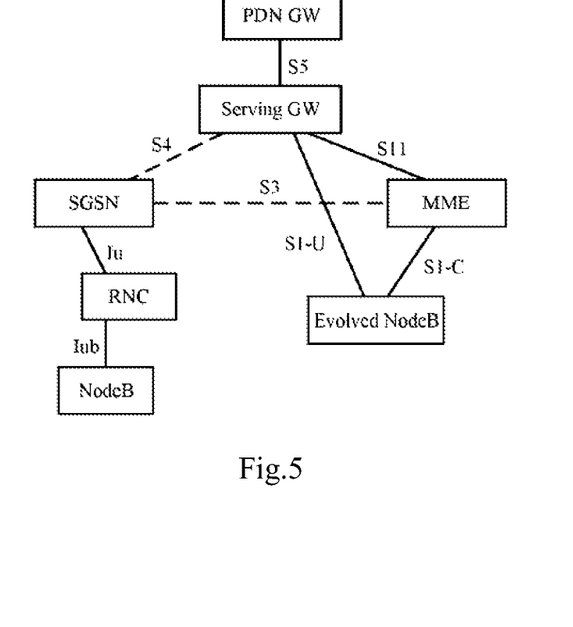
FIG. 5 is a network architectural diagram of interoperation between UMTS and LTE.

As illustrated in FIG. 5, it is an Inter-RAT network architecture between UMTS and LTE. The existing UMTS device, SGSN, has to be updated to support an interface S4 and thus can be referred to as an S4 SGSN. In this network architecture, all the user plane data passes through two core network nodes which are a Packet Data Network Gateway (PDN GW) and the Serving GW. The SGSN and the MME transmit control plane signaling via an interface S3.

When a terminal resides in the UMTS network, the terminal receives user plane data through the PDN GW, the Serving GW, the SGSN, the RNC and the NodeB via interfaces S5, S4, Iu and Iub; and when the terminal switches to the LTE network, the terminal receives user plane data through the PDN GW, the Serving GW and the eNB via interfaces S5 and S1-U.

If the terminal is intended to forward data, then there are two schemes, in one of which a direct data forward tunnel is established between the RNC and the eNB through the SGSN and the MME; and in the other of which an indirect data forward tunnel is established between the RNC and the eNB, and the data of the terminal is forwarded to the eNB through the RNC, the SGSN and the Serving GW, or a direct tunnel is established by the SGSN between the RNC and the Serving GW, and the data of the terminal is forwarded to the eNB through the RNC and the Serving GW.

The terminal may switch between different RATs for the reason of movement or channel quality. In order to assist the network to perform a more reasonable handover decision, the UE will measure and report channel quality of another RAT depending on network configuration. There are different measurement parameter configurations and separate measurement procedures for inter-RAT measurement and inter-system measurement, where a measurement gap is typically used. For example, when the E-UTRAN system measures the UTRAN system, an event B1 or an event B2 can be configured and a measurement gap can be configured depending on the capability of the UE. Specific contents of the event B1 and the event B2 are as follows:

Event B1: channel quality of an adjacent cell of a disparate system is above a threshold; and Event B2: channel quality of a serving cell is below a first threshold, and channel quality of an adjacent cell of a disparate system is above a second threshold.

When the UTRAN system measures the E-UTRAN system, events 3a, 3b, 3c and 3d can be configured particularly as follows:

Event 3a: channel quality of a serving cell is below a first threshold, and channel quality of an adjacent cell of a disparate system is above a second threshold;

Event 3b: channel quality of an adjacent cell of a disparate system is below a threshold;

Event 3c: channel quality of an adjacent cell of a disparate system is above a threshold; and Event 3d: the strongest cell in an adjacent cell of a disparate system is changed.

Figure 6:
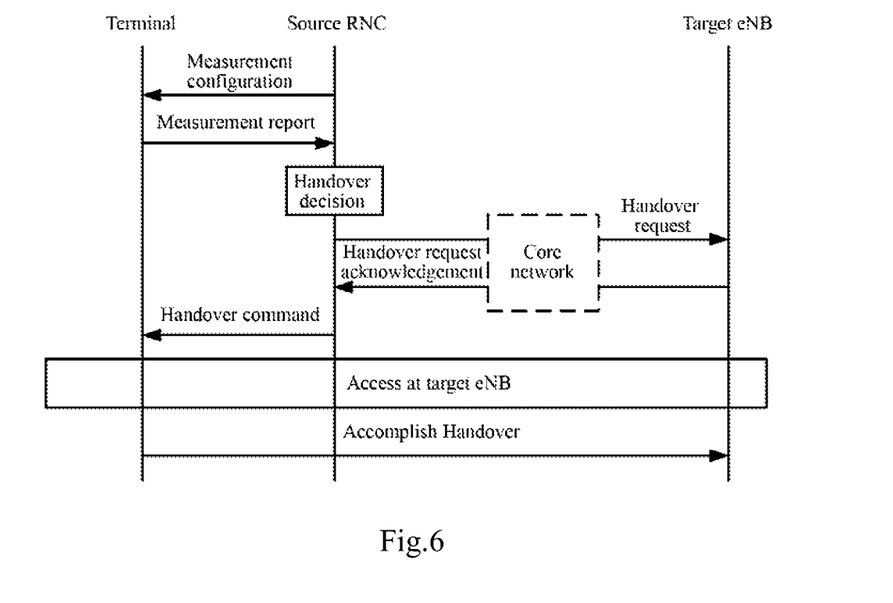
FIG. 6 is a flow chart of a handover from UMTS to LTE at the RAN side.

Based upon the foregoing network architecture and Inter-RAT measurement mechanism, a simplified flow chart of switching by a terminal from UMTS to LTE at the Radio Access Network (RAN) side is as illustrated in FIG. 6 and generally includes the following steps:

A source RNC sends a measurement configuration message to the terminal; the terminal measures according to the measurement configuration message and reports a measurement result to the source RNC; the source RNC makes a handover decision in view of the reported measurement result; the source RNC sends a handover request to a target eNB through the core network when deciding to switch to LTE; the target eNB sends a handover request acknowledgement to the source RNC through the core network according to the handover request; the source RNC sends a handover command to the terminal; the terminal accesses the target eNB upon reception of the handover command; and the terminal sends a handover completion message after successfully accessing the target eNB.

Particularly, all of the measurement configuration message, the measurement report message, the handover command and the handover completion message are signaling of the access network side. Both the handover request transmitted from the source RNC to the target eNB and the handover request acknowledgement transmitted from the target eNB to the source RNC are containers in interface messages in conformity with a message encapsulation format of the core network and transmitted through the core network. The handover request acknowledgement message contains an RRC container with contents thereof being the handover command, and the source RNC transmits this message to the terminal via a null interface.

Figure 7:
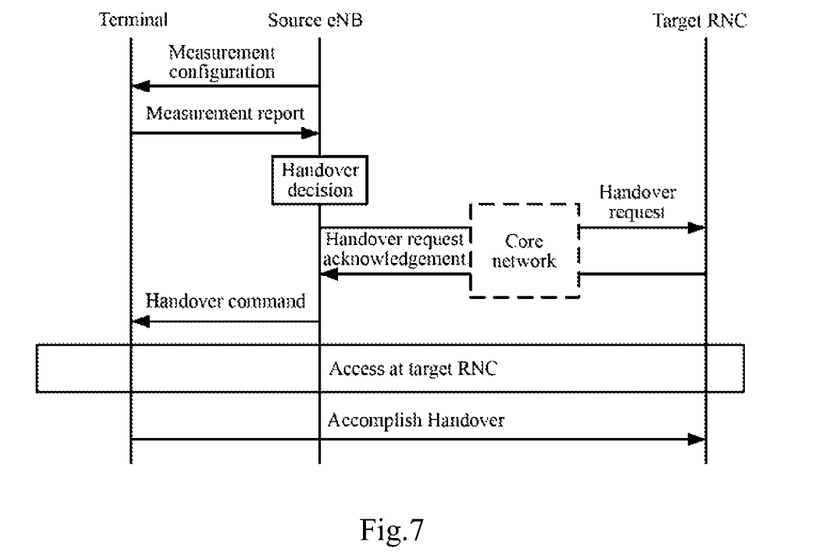
FIG. 7 is a flow chart of a handover from LTE to UMTS at the RAN side.

Based upon the foregoing network architecture and Inter-RAT measurement mechanism, a simplified flow chart of switching from the LTE system to UMTS at the RAN side is as illustrated in FIG. 7 and generally includes the following steps:

A source eNB sends a measurement configuration message to a terminal; the terminal measures according to the measurement configuration message and reports a measurement result to the source eNB; the source eNB makes a handover decision in view of the reported measurement result; the source eNB sends a handover request to a target RNC through the core network when deciding to switch to LTE; the target RNC sends a handover request acknowledgement to the source eNB through the core network according to the handover request; the source eNB sends a handover command to the terminal; the terminal accesses the target RNC upon reception of the handover command; and the terminal sends a handover completion message after successfully accessing the target RNC.

Particularly, all of the measurement configuration message, the measurement report message, the handover command and the handover completion message are signaling of the access network side. Both the handover request transmitted from the source eNB to the target RNC and the handover request acknowledgement transmitted from the target RNC to the source eNB are containers in interface messages in conformity with a message encapsulation format of the core network and transmitted through the core network. The handover request acknowledgement message contains an RRC container with contents thereof being the handover command, and the source eNB transmits this message to the terminal via a null interface.

No matter whether the handover is from UTMS to LTE or from LTE to UMTS, the measurement configuration message sent from the source access node includes measurement configuration contents, e.g., a measurement object, configured events, a measurement result reporting scheme and the like. The terminal measures according to the measurement configuration contents and reports the measurement result in the configured measurement reporting scheme.

Taking the handover from UTMS to LTE as an example, based upon existing protocols, Inter-RAT measurement in the measurement configuration message sent from the source RNC includes the measurement configuration contents. E-UTRAN Measured Results in the measurement report message reported by the terminal include the measurement result, and E-UTRAN Event Results in the measurement report message include an event result.

Contents of an Information Element (IE) of the E-UTRAN Measured Results particularly include: a carrier frequency of E-UTRAN, and an identifier and a measurement result of a cell satisfying a report condition at the frequency. The measurement result is typically represented by Reference Signal Receiving Power (RSRP) and Reference Signal Received Quality (RSRQ).

Contents of an Information Element (IE) of the E-UTRAN Event Results particularly include: an Inter-RAT measurement event ID, a carrier frequency of E-UTRAN, and an identifier of a cell satisfying a report condition at the frequency.

In the Inter-RAT measurement mechanism in the prior art, the measurement object configured for measurement is a single frequency, that is, only one frequency or a cell at the single frequency is configured, so only an Inter-RAT single-carrier handover but no multi-carrier handover is supported. At present, the multi-carrier technologies have been introduced to both the UMTS and LTE systems to improve the data transmission rate of the user, but when the user using the multi-carrier technologies switches between these two systems, he has to firstly fall back to the single-carrier state to perform a handover of the PS domain and can enter the multi-carrier state again only after finishing the handover. This will undoubtedly lower the data transmission rate of the user and degrade user experience. Moreover, when the terminal switches from another system supporting high-speed data transmission to UMTS or LTE, the multi-carrier handover to these two systems is not supported, thus also lowering the data transmission rate of the user and degrading user experience.

SUMMARY OF THE INVENTION

Embodiments of the invention provide a method and device for reporting terminal measurement and inter-system interoperation, to assist the network to perform a multi-carrier handover between systems to thereby shorten the report delay, improve the data transmission rate when the terminal performs the handover of the PS domain between different systems, and enhance the user experience.

The invention provides a method for reporting terminal measurement, which includes:

receiving measurement configuration information sent from an access device of a source system;

measuring cells on at least two frequencies in a target system according to the measurement configuration information; and reporting measurement results obtained by measuring the cells on the at least two frequencies in the target system to the access device of the source system when a measurement report is triggered according to the measurement configuration information, so that the access device of the source system determines a primary cell and a secondary cell of the target system to which a handover is to be performed according to the measurement results.

The invention provides a method for inter-system interoperation, which includes:

configuring, by an access device of a source system, a terminal with measurement configuration information when determining that the terminal is to switch to a target system, wherein the measurement configuration information comprises at least two frequencies/cells on at least two frequencies of the target system and a measurement result reporting scheme;

sending, by the access device of the source system, the measurement configuration information to the terminal, and receiving measurement results reported by the terminal; and determining, by the access device of the source system, a primary cell and a secondary cell of the target system to which a handover is to be performed according to the measurement results, and instructing the terminal to switch to the primary cell and the secondary cell of the target system.

The invention provides a user equipment, which includes:

a measurement configuration receiving unit configured to receive measurement configuration information sent from an access device of a source system;

a measuring unit configured to measure cells on at least two frequencies in a target system according to the measurement configuration information; and a measurement reporting unit configured to report measurement results obtained by measuring the cells on the at least two frequencies in the target system to the access device of the source system when a measurement report is triggered according to the measurement configuration information, so that the access device of the source system determines a primary cell and a secondary cell of the target system to which a handover is to be performed according to the measurement results.

The invention further provides a network-side access device, which includes:

a measurement configuring unit configured to configure a terminal with measurement configuration information when determining that the terminal is to switch from a current system to a target system, wherein the measurement configuration information comprises at least two frequencies/cells on at least two frequencies of the target system and a measurement result reporting scheme;

an information receiving unit configured to send the measurement configuration information to the terminal and to receive measurement results reported by the terminal; and a handover assisting unit configured to determine a primary cell and a secondary cell of the target system to which a handover is to be performed according to the measurement results and to instruct the terminal to switch to the primary cell and the secondary cell of the target system.

With the method and device for reporting terminal measurement and inter-system interoperation according to the invention, advantageous effects are as follows: they can assist the network to perform a multi-carrier handover between systems to thereby shorten the report delay, improve the data transmission rate when the terminal performs the handover of the PS domain between different systems, and enhance the user experience.

DETAILED DESCRIPTION OF THE EMBODIMENTS

The method and device for reporting terminal measurement and inter-system interoperation according to the invention will be described below in further details in connection with the drawings and embodiments thereof.

Figure 8:
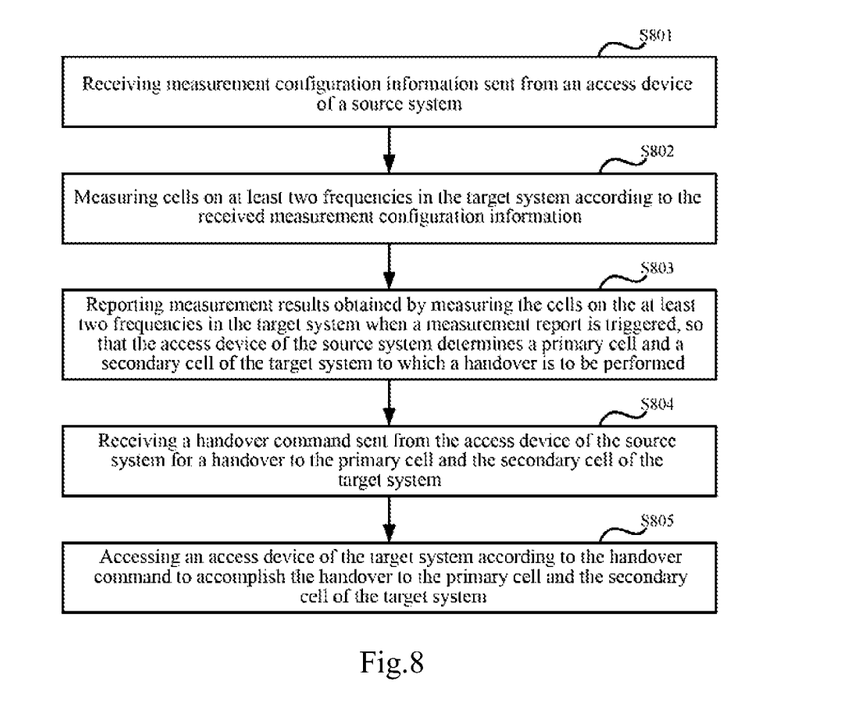
FIG. 8 is a flow chart of a method for reporting terminal measurement according to an embodiment of the invention.

The invention proposes a terminal measurement reporting method for inter-system interoperation to assist the network to perform a multi-carrier handover between systems to thereby shorten the report delay, improve the data transmission rate when the terminal performs the handover of the PS domain between different systems, and enhance the user experience. As illustrated in FIG. 8, the method includes:

Step S801, receiving measurement configuration information sent from an access device of a source system, where the measurement configuration information indicates the terminal how to measure information of a cell in a target system and how to report a measurement result.

Step S802, measuring cells on at least two frequencies in the target system according to the received measurement configuration information; and in the method according to the invention, information of cells on at least two frequencies is measured instead of measuring and reporting a cell on a single frequency.

Step S803, reporting measurement results obtained by measuring the cells on the at least two frequencies in the target system to the access device of the source system when a measurement report is triggered according to the measurement configuration information, so that the access device of the source system determines a primary cell and a secondary cell of the target system to which a handover is to be performed according to the measurement results.

In the method for reporting terminal measurement according to the invention, the terminal measures cells on a plurality of frequencies and reports measurement results according to configuration of the network side, so the network-side device can obtain measurement information of the plurality of frequencies, and the target system is a system in which a plurality of cells can be aggregated to serve the UE concurrently, and preferably, the foregoing target system is an Evolved UMTS Terrestrial Radio Access Network (E-UTRAN) system and of course can alternatively be another system in which a plurality of cells can be aggregated to serve the UE concurrently, while the source system is a system where the User Equipment (UE) currently resides, which can be a UMTS Terrestrial Radio Access Network (UTRAN) system, a GSM EDGE Radio Access Network (GERAN) system, a Wireless Local Area Network (WLAN) system, a Worldwide Interoperability for Microwave Access (WiMAX) system or a Code Division Multi-Access (CDMA) 2000 system. Thus, with the method according to the invention, before a multi-carrier handover (PS HO) to E-UTRAN from another system is performed, the terminal is configured to measure and report a plurality of frequencies of an E-UTRAN cell, so it is possible to assist the network to perform a multi-carrier handover between systems to thereby shorten the report delay, improve the data transmission rate when the terminal performs the handover of the PS domain between different systems, and enhance the user experience.

Preferably, the method for reporting terminal measurement according to the embodiment further includes:

Step S804, receiving a handover command sent from the access device of the source system for a handover to the primary cell and the secondary cell of the target system; and Step S805, accessing an access device of the target system according to the handover command to accomplish the handover to the primary cell and the secondary cell of the target system to thereby accomplish the multi-carrier handover to the multi-carrier system.

Figure 9:
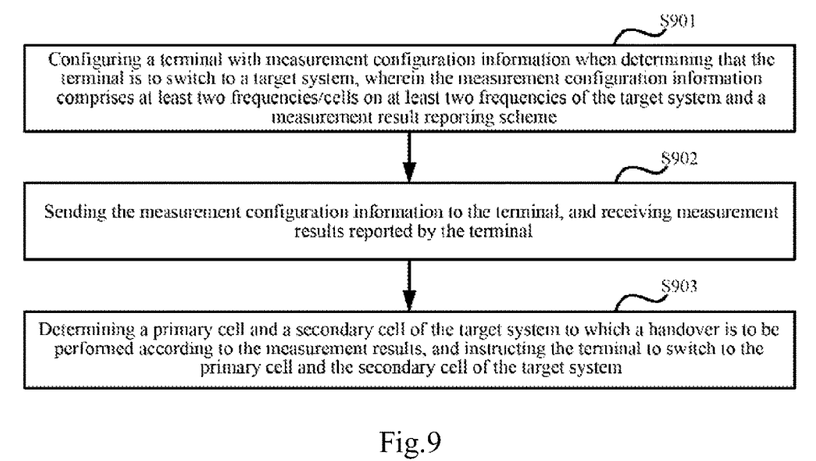
FIG. 9 is a flow chart of a method for inter-system interoperation according to an embodiment of the invention.

The invention provides a method for inter-system interoperation, as illustrated in FIG. 9, which includes:

Step S901, configuring, by an access device of a source system, a terminal with measurement configuration information when determining that the terminal is to switch to a target system, wherein the measurement configuration information comprises at least two frequencies/cells on at least two frequencies of the target system and a measurement result reporting scheme;

In order to enable the terminal to measure cells on a plurality of frequencies, the access device of the source system shall configure the plurality of frequencies or configure the cells on the plurality of frequencies, and furthermore, shall further configure a result reporting scheme, so that the terminal reports measurement information of the cells on the plurality of frequencies.

Step S902, sending, by the access device of the source system, the measurement configuration information to the terminal, and receiving measurement results reported by the terminal;

As described above, the terminal measures the cells on the at least two frequencies in the target system according to the received measurement configuration information, and reports the measurement results obtained by measuring the cells on the plurality of frequencies in the target system to the access device of the source system according to the configured measurement result reporting scheme when determining that a measurement report is triggered.

Step S903, determining, by the access device of the source system, a primary cell and a secondary cell of the target system to which a handover is to be performed according to the measurement results, and instructing the terminal to switch to the primary cell and the secondary cell of the target system.

Preferably, the foregoing target system is an Evolved UMTS Terrestrial Radio Access Network (E-UTRAN) system and of course can alternatively be another system in which a plurality of cells can be aggregated to serve the UE concurrently, while the source system is a system where the User Equipment (UE) currently resides, which can be a UMTS Terrestrial Radio Access Network (UTRAN) system, a GSM EDGE Radio Access Network (GERAN) system, a Wireless Local Area Network (WLAN) system, a Worldwide Interoperability for Microwave Access (WiMAX) system or a Code Division Multi-Access (CDMA) 2000 system. Thus, with the method according to the invention, the network-side access device can accomplish a multi-carrier handover of the UE by use of the measurement results reported by the terminal.

Preferably, instructing the terminal to switch to the primary cell and the secondary cell of the target system in the step S903 specifically includes: sending, the access device of the source system, a handover request to an access device of the target system for a handover to the primary cell and the secondary cell of the target system; and sending, the access device of the source system, a handover command to the terminal upon reception of a handover request acknowledgement returned from the access device of the target system, to instruct the terminal to switch to the primary cell and the secondary cell of the target system. Preferably, the above handover request includes the primary cell and a list of secondary cells of the target system, and preferably, can further include measurement results of the primary cell and the secondary cell.

Preferred implementations of the invention will be given below by taking an E-UTRAN system as the target system.

In a first implementation according to the invention, the embodiment of the invention adds an additional measurement report indicator in the measurement configuration information in the basis of the existing protocols, to instruct the terminal to further report a measurement result of a cell on at least one other frequency in addition to a measurement result of a cell on a frequency which triggers a measurement report. Particularly, the additional measurement report indicator can be set for a measurement event or can alternatively be set for a measurement object, where if the indicator is set for a measurement event, then the measurement event will trigger a report together with an additional report of the measurement result of the cell on the at least one other frequency; and if the indicator is set for a measurement object, e.g., a frequency, then a cell at the frequency will trigger a measurement report together with an additional report of the measurement result of the cell on the at least one other frequency.

In the embodiment of the invention, a plurality of frequencies/cells on a plurality of frequencies are configured in the measurement configuration information, but in a practical measurement process, measurements at respective frequencies will be performed separately, and when measurement at a specific frequency satisfies a report condition, for example, a measurement event configured at one of the frequencies satisfies the report condition, then in the prior art, if the measurement report is set for the frequency, then measurement information of a cell on any other frequency will not be reported. In this embodiment, the additional measurement report indicator is added so that the terminal reports measurement reports of a cell on one of the frequencies which triggers the measurement report and a cell on at least one other frequency to the access device of the source system when determining that the cell on one of the frequencies triggers the measurement report and that there is an additional measurement report indicator in the measurement configuration information.

Preferably, the terminal reports measurement reports of cells with the strongest channel quality on each of currently measured frequencies to the access device of the source system when determining that a cell on one of the frequencies triggers a measurement report and that there is an additional measurement report indicator in the measurement configuration information.

In this embodiment, E-UTRAN Additional Measurement Results are added in the measurement report message reported by the terminal, to thereby include the measurement result of the cell on the at least one other frequency except the measurement result of the cell on the frequency which triggers the measurement report.

In this embodiment, the measurement results obtained by the terminal through measuring the cells on the at least two frequencies in the target system include cell identifiers and/or cell channel quality, where the cell channel quality is typically represented by Reference Signal Received Power (RSRP) and Reference Signal Received Quality (RSRQ). The cell channel quality is an instantaneous value or a statistic value obtained by measuring over a preset length of period of time and filtering.

Preferably, the number of frequencies to be reported can be further defined, and in this embodiment, the measurement configuration information further includes the number of frequencies required to be reported, A, and the terminal reports measurement results of cells on A frequencies to the access device of the source system, where $A \geq 2$; or the number of cells to be reported per frequency can be further defined, the measurement configuration information further includes the number of cells required to be reported, B, and the terminal reports measurement results of B cells on each of the at least two frequencies to the access device of the source system, where $B \geq 1$; or both of the two numbers can be defined, the measurement configuration information further includes the number of frequencies required to be reported, A, and the number of cells required to be reported, B, and the terminal reports measurement results of B cells on each of A frequencies to the access device of the source system.

Preferably, a channel quality threshold of a cell to be reported can be further defined, that is, there is no report if channel quality of a cell is not above the channel quality threshold. In this embodiment, the measurement configuration information further includes the channel quality threshold, and channel quality of each of the cells on the at least two frequencies reported by the terminal is above the channel quality threshold.

In a second implementation according to the invention, one of the frequencies is configured with additional measurement in the measurement configuration information, where the configuration of additional measurement refers to that when a specific frequency is configured for measurement, some other additional measurement frequencies is configured additionally, and when a cell on the frequency configured with the additional measurement triggers a measurement report, cells, of which measurement results are obtained, on the additional measurement frequencies are also reported. Thus, the terminal reports measurement reports of cells with the strongest channel quality on each of additional measurement frequencies related to one of the frequencies which triggers a measurement report to the access device of the source system when determining that the one of the frequencies is configured with additional measurement and a cell on the frequency triggers a measurement report.

Two particular embodiments will be given below.

First Embodiment: In the UTRAN System, an Additional Measurement Report is Performed for E-UTRAN A dual-mode terminal supporting both U-TRAN and E-UTRAN systems currently operates in UTRAN. An RNC of UTRAN configures the terminal with measurement on E-UTRAN, including a plurality of E-UTRAN frequencies required to be measured, and enables an additional measurement report, that is, measurement configuration information includes an additional measurement report indicator. Assumed E-UTRAN frequencies configured currently for the terminal and required to be measured are f1, f2 and f3, and an additional measurement report is initiated when an event triggered at f1 is reported. As the UE moves, a measurement event configured at f1 satisfies a report condition, and then an additional measurement report is triggered, where reported contents include E-UTRAN cells on f1 satisfying the condition (e.g., a cell 1 and a cell 2) and measurement results of channel quality thereof (RSRP and RSRQ). Since an additional multi-carrier (multi-cell) measurement report is configured, a currently reported measurement report message further includes the strongest E-UTRAN cells on f2 and f3 of which measurement results are obtained (e.g., a cell 3 on f2 and a cell 4 on f3), where "strongest" refers to that the value of RSRP or RSRQ is largest, and also can further include measurement results of these strongest cells (the cell 3 and the cell 4 reported).

Thus, in an Inter-RAT measurement report, in addition to a cell(s) which triggers a measurement report currently, a cell(s) on another frequency (frequencies) is further included, to thereby shorten the report delay and assist the network to make an Inter-RAT multi-carrier handover decision.

Second Embodiment: Multi-Carrier Handover (PS HO) from UTRAN to E-UTRAN

A dual-mode terminal supporting both U-TRAN and E-UTRAN systems currently operates in UTRAN. Assumed the terminal is in the TDD mode and operates in a 6 downlink-carrier state (multi-carrier technology), or the terminal is in the FDD mode and operates in a 4 downlink-cell state (multi-cell technology). An RNC of UTRAN configures the terminal with measurement on E-UTRAN, including a plurality of E-UTRAN frequencies required to be measured, and enables an additional measurement report. If the terminal moves at this time to thereby trigger an Inter-RAT measurement report and also additional multi-carrier (multi-cell) measurement results are included, and thereafter the network decides that the terminal need switch to E-UTRAN, then a source RNC sends a handover request message to a target eNB, where the message carries a target primary cell and a list of target secondary cells to which a handover is requested and also carries measurement results (RSRP and/or RSRQ) of the target secondary cells. Such information is reported as measured by the terminal (including an additional measurement report) and can be put in an interface message or can alternatively be put in an RRC container. For example, the target primary cell is carried in the interface message, and the list of target secondary cells and measurement results thereof are put in the RRC container. If the target eNB agrees to accept the terminal over multiple carriers upon reception of the handover request message from the source RNC, then the target eNB returns a handover request acknowledgement message to the source RNC, where the message carries a handover command including information of multiple cells (one primary cell and one or more secondary cells) to be accessed by the terminal at the target eNB. The source RNC transmits the contents of the handover command to the terminal via a null interface. The terminal initiates a multi-carrier handover from UTRAN to E-UTRAN upon reception of the handover command.

Thus the terminal can accomplish a multi-carrier handover from UTRAN to E-UTRAN to thereby improve the data transmission rate when performing the handover of the PS domain between different systems and enhance the user experience.

Figure 10:
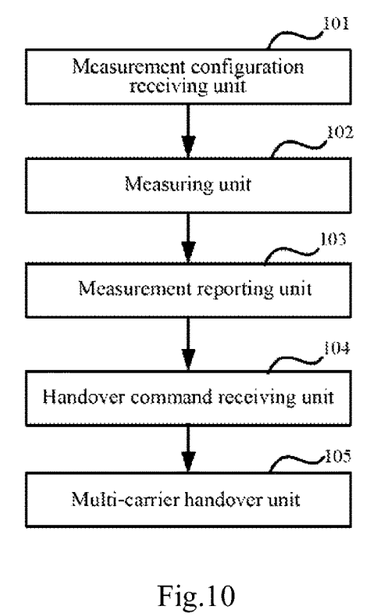
FIG. 10 is a structural diagram of a user equipment according to an embodiment of the invention.

The invention further provides a User Equipment (UE) as illustrated in FIG. 10, which includes: a measurement configuration receiving unit 101 configured to receive measurement configuration information sent from an access device of a source system; a measuring unit 102 configured to measure cells on at least two frequencies in a target system according to the measurement configuration information; and a measurement reporting unit 103 configured to report measurement results obtained by measuring the cells on the at least two frequencies in the target system to the access device of the source system when a measurement report is triggered according to the measurement configuration information, so that the access device of the source system determines a primary cell and a secondary cell of the target system to which a handover is to be performed according to the measurement results.

Preferably, the measurement reporting unit 103 is specifically configured to report measurement reports of a cell on one of the frequencies which triggers a measurement report and a cell on at least one other frequency to the access device of the source system when determining that the cell on one of the frequencies triggers the measurement report and that there is an additional measurement report indicator in the measurement configuration information.

Preferably, the measurement reporting unit 103 is specifically configured to determine to trigger a measurement report when a measurement event configured at one of the frequencies satisfies a report condition.

The measurement configuration information further comprises the number of frequencies required to be reported, A, and the measurement reporting unit 103 is specifically configured to report measurement results of cells on A frequencies to the access device of the source system, where A≥2; or The measurement configuration information further comprises the number of cells required to be reported, B, and the measurement reporting unit 103 is specifically configured to report measurement results of B cells on each of the at least two frequencies to the access device of the source system, where B≥1; or The measurement configuration information further comprises the number of frequencies required to be reported, A, and the number of cells required to be reported, B, and the measurement reporting unit 103 is specifically configured to report measurement results of B cells on each of A frequencies to the access device of the source system.

Preferably, the measurement configuration information further comprises a channel quality threshold, and channel quality of each of the cells on the at least two frequencies reported by the measurement reporting unit 103 is above the channel quality threshold.

Preferably, the measurement reporting unit 103 is specifically configured to report measurement reports of cells with the strongest channel quality on each of currently measured frequencies to the access device of the source system when determining that a cell on one of the frequencies triggers a measurement report and that there is an additional measurement report indicator in the measurement configuration information.

Preferably, the measurement reporting unit 103 is specifically configured to report measurement reports of cells with the strongest channel quality on each of additional measurement frequencies related to one of the frequencies which triggers a measurement report to the access device of the source system when determining that the one of the frequencies is configured with additional measurement and a cell on the frequency triggers a measurement report.

Preferably, the measurement results obtained by the measuring unit through measuring the cells on the at least two frequencies in the target system comprise cell identifiers and/or cell channel quality; and the cell channel quality is an instantaneous value or a statistic value measured over a preset length of period of time.

Preferably, the UE further includes: a handover command receiving unit 104 configured to receive a handover command sent from the access device of the source system for a handover to the primary cell and the secondary cell of the target system; and a multi-carrier handover unit 105 configured to access an access device of the target system according to the handover command to accomplish the handover to the primary cell and the secondary cell of the target system.

Figure 11:
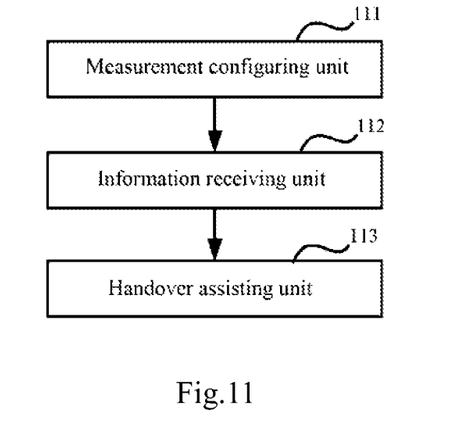
FIG. 11 is a structural diagram of a network-side access device according to an embodiment of the invention.

An embodiment of the invention further provides a network-side access device as illustrated in FIG. 11, which includes: a measurement configuring unit 111 configured to configure a terminal with measurement configuration information when determining that the terminal is to switch from a current system to a target system, wherein the measurement configuration information comprises at least two frequencies/cells on at least two frequencies of the target system and a measurement result reporting scheme; an information receiving unit 112 configured to send the measurement configuration information to the terminal and to receive measurement results reported by the terminal; and a handover assisting unit 113 configured to determine a primary cell and a secondary cell of the target system to which a handover is to be performed according to the measurement results and to instruct the terminal to switch to the primary cell and the secondary cell of the target system.

Preferably, the measurement configuration information configured by the measurement configuring unit 111 comprises an additional measurement report indicator used to instruct the terminal to further report a measurement result of a cell on at least one other frequency in addition to a measurement result of a cell on a frequency which triggers a measurement report.

Preferably, the measurement configuration information configured by the measurement configuring unit 111 comprises additional measurement configured on one of the frequencies used to instruct the terminal to report measurement reports of cells with the strongest channel quality on each of additional measurement frequencies related to the one of the frequencies configured with the additional measurement to the access device of the source system when a cell on the frequency triggers a measurement report.

Preferably, the measurement configuration information configured by the measurement configuring unit 111 further comprises the number of frequencies required to be reported, A, and/or the number of cells required to be reported per frequency, B, where A≥2 and B≥1; and/or the measurement configuration information comprises a channel quality threshold.

Preferably, the handover assisting unit 113 is specifically configured to send a handover request to an access device of the target system for a handover to the primary cell and the secondary cell of the target system and to send a handover command to the terminal upon reception of a handover request acknowledgement returned from the access device of the target system, to instruct the terminal to switch to the primary cell and the secondary cell of the target system.

Preferably, the network-side access device is a network access device in a UMTS Terrestrial Radio Access Network, UTRAN, system, a GSM EDGE Radio Access Network, GERAN, system, a Wireless Local Area Network, WLAN, system, a Worldwide Interoperability for Microwave Access, WiMAX, system or a Code Division Multi-Access, CDMA, 2000 system, and the target system is an Evolved UMTS Terrestrial Radio Access Network, E-UTRAN, system.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

What is claimed is:

1. A method for reporting terminal measurement, comprising:
receiving measurement configuration information sent from an access device of a source system;
measuring cells on at least two frequencies in a target system according to the measurement configuration information; and
reporting simultaneously measurement results obtained by measuring the cells on the at least two frequencies in the target system, in a measurement report message to the access device of the source system when a measurement report is triggered according to the measurement configuration information, so that the access device of the source system determines a primary cell and a secondary cell of the target system to which a handover is to be performed according to the measurement results; wherein the source system and the target system are systems of different Radio Access Technologies, wherein reporting the measurement results to the access device of the source system specifically comprises reporting measurement reports of cells with the strongest channel quality on each of additional measurement frequencies related to one of the frequencies which triggers a measurement report to the access device of the source system when determining that the one of the frequencies is configured with additional measurement and a cell on the frequency triggers a measurement report.

2. The method according to claim 1, wherein reporting the measurement results to the access device of the source system specifically comprises:
reporting measurement reports of a cell on one of the frequencies which triggers a measurement report and a cell on at least one other frequency to the access device of the source system when determining that the cell on one of the frequencies triggers the measurement report and that the measurement configuration information comprises an additional measurement report indicator.

3. The method according to claim 1, wherein reporting the measurement results to the access device of the source system specifically comprises:
reporting measurement reports of cells with the strongest channel quality on each of currently measured frequencies to the access device of the source system when determining that a cell on one of the frequencies triggers a measurement report and that the measurement configuration information comprises an additional measurement report indicator.

4. The method according to claim 1, wherein the measurement results obtained by measuring the cells on the at least two frequencies in the target system comprise cell identifiers and/or cell channel quality; and
the cell channel quality is an instantaneous value or a statistic value measured over a preset length of period of time.

5. The method according to claim 1, further comprising:
receiving a handover command sent from the access device of the source system for a handover to the primary cell and the secondary cell of the target system; and
accessing an access device of the target system according to the handover command to accomplish the handover to the primary cell and the secondary cell of the target system.

6. The method according to claim 1, wherein the measurement configuration information further comprises the number of frequencies required to be reported, A, and the terminal reports simultaneously measurement results of cells on A frequencies in the measurement report message to the access device of the source system, wherein A≥2; or
the number of cells required to be reported, B, and the terminal reports simultaneously in the measurement report message measurement results of B cells on each of the at least two frequencies to the access device of the source system, wherein B≥1; or
the measurement configuration information further comprises the number of frequencies required to be reported, A, and the number of cells required to be reported, B, and the terminal reports simultaneously in the measurement report message measurement results of B cells on each of A frequencies to the access device of the source system;

wherein A is positive integer and B is positive integer.

7. A method for inter-system interoperation, comprising:
configuring, by an access device of a source system, a terminal with measurement configuration information when determining that the terminal is to switch to a target system, wherein the measurement configuration information comprises at least two frequencies/cells on at least two frequencies of the target system and a measurement result reporting scheme;
sending, by the access device of the source system, the measurement configuration information to the terminal, and receiving measurement results reported simultaneously in a measurement report message by the terminal; and
determining, by the access device of the source system, a primary cell and a secondary cell of the target system to which a handover is to be performed according to the measurement results, and instructing the terminal to switch to the primary cell and the secondary cell of the target system; wherein the source and the target system are systems of different Radio Access Technologies, and wherein reporting the measurement results to the access device of the source system specifically comprises reporting measurement reports of cells with the strongest channel quality on each of additional measurement frequencies related to one of the frequencies which triggers a measurement report to the access device of the source system when determining that the one of the frequencies is configured with additional measurement and a cell on the frequency triggers a measurement report.

8. The method according to claim 7, wherein the measurement configuration information comprises an additional measurement report indicator used to instruct the terminal to further report a measurement result of a cell on at least one other frequency in addition to a measurement result of a cell on a frequency which triggers a measurement report.

9. The method according to claim 8, wherein the measurement configuration information comprises additional measurement configured on one of the frequencies used to instruct the terminal to report measurement reports of cells with the strongest channel quality on each of additional measurement frequencies related to the one of the frequencies configured with the additional measurement to the access device of the source system when a cell on the frequency triggers a measurement report.

10. The method according to claim 7, wherein instructing the terminal to switch to the primary cell and the secondary cell of the target system specifically comprises:
sending, the access device of the source system, a handover request to an access device of the target system for a handover to the primary cell and the secondary cell of the target system; and
sending, the access device of the source system, a handover command to the terminal upon reception of a handover request acknowledgement returned from the access device of the target system, to instruct the terminal to switch to the primary cell and the secondary cell of the target system.

11. The method according to claim 7, wherein the measurement configuration information further comprises the number of frequencies required to be reported, A, or the number of cells required to be reported per frequency, B, wherein A≥2 and B≥1; or
the measurement configuration information comprises a channel quality threshold;
wherein A is a positive integer and B is a positive integer.

12. A User Equipment, UE, comprising:
a measurement configuration receiving unit configured to receive measurement configuration information sent from an access device of a source system;
a measuring unit configured to measure cells on at least two frequencies in a target system according to the measurement configuration information; and
a measurement reporting unit configured to report simultaneously measurement results obtained by measuring the cells on the at least two frequencies in the target system, in a measurement report message to the access device of the source system when a measurement report is triggered according to the measurement configuration information, so that the access device of the source system determines a primary cell and a secondary cell of the target system to which a handover is to be performed according to the measurement results; wherein the source system and the target system are systems of different Radio Access Technology, and wherein reporting the measurement results to the access device of the source system specifically comprises reporting measurement reports of cells with the strongest channel quality on each of additional measurement frequencies related to one of the frequencies which triggers a measurement report to the access device of the source system when determining that the one of the frequencies is configured with additional measurement and a cell on the frequency triggers a measurement report.

13. The UE according to claim 12, wherein the measurement reporting unit is specifically configured to report measurement reports of a cell on one of the frequencies which triggers a measurement report and a cell on at least one other frequency to the access device of the source system when determining that the cell on one of the frequencies triggers the measurement report and that the measurement configuration information comprises an additional measurement report indicator.

14. The UE according to claim 12, wherein the measurement reporting unit is specifically configured to report measurement reports of cells with the strongest channel quality on each of currently measured frequencies to the access device of the source system when determining that a cell on one of the frequencies triggers a measurement report and that there is an additional measurement report indicator in the measurement configuration information.

15. The UE according to claim 12, wherein the measurement results obtained by the measuring unit through measuring the cells on the at least two frequencies in the target system comprise cell identifiers and/or cell channel quality; and the cell channel quality is an instantaneous value or a statistic value measured over a preset length of period of time.

16. The UE according to claim 12, further comprising:
a handover command receiving unit configured to receive a handover command sent from the access device of the source system for a handover to the primary cell and the secondary cell of the target system; and
a multi-carrier handover unit configured to access an access device of the target system according to the handover command to accomplish the handover to the primary cell and the secondary cell of the target system.

17. The UE according to claim 12, the measurement configuration information further comprises the number of frequencies required to be reported, A, and the measurement reporting unit is configured to report simultaneously measurement results of cells on A frequencies in the measurement report message to the access device of the source system, wherein A≥2; or
the measurement configuration information further comprises the number of cells required to be reported, B, and the measurement reporting unit is configured to report simultaneously in the measurement report message measurement results of B cells on each of the at least two frequencies to the access device of the source system, wherein B≥1; or
the measurement configuration information further comprises the number of frequencies required to be reported, A, and the number of cells required to be reported, B, and the measurement reporting unit is configured to report simultaneously in the measurement report message measurement results of B cells on each of A frequencies to the access device of the source system;
wherein A is positive integer and B is positive integer.

* * * * *